(12) United States Patent
Lang et al.

(10) Patent No.: US 7,335,713 B2
(45) Date of Patent: *Feb. 26, 2008

(54) METHOD FOR PREPARING A FLEXIBLE SUPERABSORBENT BINDER POLYMER COMPOSITION

(75) Inventors: Angela Jones Lang, High Point, NC (US); Dave Allen Soerens, Neenah, WI (US); Iqbal Ahmed, Greensboro, NC (US); Scott J. Smith, Greensboro, NC (US); Michael Ralph Lostocco, Appleton, WI (US); W. Clayton Bunyard, DePere, WI (US)

(73) Assignee: Stockhausen, Inc., Greensboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/561,145

(22) Filed: Nov. 17, 2006

(65) Prior Publication Data

US 2007/0129517 A1    Jun. 7, 2007

Related U.S. Application Data

(63) Continuation-in-part of application No. 11/293,043, filed on Dec. 2, 2005, now Pat. No. 7,312,286.

(51) Int. Cl.
*C08F 4/04* (2006.01)
*C08F 20/06* (2006.01)

(52) U.S. Cl. .................. 526/218.1; 526/319; 526/279; 526/317.1

(58) Field of Classification Search ............. 526/218.1, 526/319, 279, 317.1
See application file for complete search history.

(56) References Cited

U.S. PATENT DOCUMENTS

| | | |
|---|---|---|
| 3,617,362 A | 11/1971 | Bemmels |
| 3,959,242 A | 5/1976 | Watts et al. |
| 3,963,605 A | 6/1976 | Seabourn |
| 3,963,805 A | 6/1976 | Chu |
| 4,251,643 A | 2/1981 | Harada et al. |
| 4,291,136 A | 9/1981 | Keogh |
| 4,328,323 A | 5/1982 | Keogh |
| 4,343,917 A | 8/1982 | Keogh |
| 4,353,997 A | 10/1982 | Keogh |
| 4,369,289 A | 1/1983 | Keogh |
| 4,408,011 A | 10/1983 | Barnabeo |
| 4,434,272 A | 2/1984 | Keogh |
| 4,440,907 A | 4/1984 | Keogh |
| 4,446,279 A | 5/1984 | Keogh |
| 4,459,396 A | 7/1984 | Yamasaki et al. |
| 4,489,029 A | 12/1984 | Keogh et al. |
| 4,493,924 A | 1/1985 | Rifi |
| 4,502,968 A | 3/1985 | Noda et al. |
| 4,526,930 A | 7/1985 | Keogh |
| 4,551,504 A | 11/1985 | Barnabeo |
| 4,575,535 A | 3/1986 | Keogh |
| 4,579,913 A | 4/1986 | Keogh |
| 4,593,071 A | 6/1986 | Keogh |
| 4,676,820 A | 6/1987 | Le Sergent et al. |
| 4,753,993 A | 6/1988 | Keogh |
| 4,767,820 A | 8/1988 | Keogh |
| 4,806,594 A | 2/1989 | Gross et al. |
| 4,921,136 A | 5/1990 | Roggenburg, Jr. |
| 4,940,646 A | 7/1990 | Pawlowski |
| 5,047,476 A | 9/1991 | Keogh |
| 5,089,564 A | 2/1992 | Bullen |
| 5,112,919 A | 5/1992 | Furrer et al. |
| 5,145,906 A | 9/1992 | Chambers et al. |
| 5,196,470 A | 3/1993 | Anderson et al. |
| 5,204,404 A | 4/1993 | Werner, Jr. et al. |
| 5,354,829 A | 10/1994 | Swisher et al. |
| 5,364,382 A | 11/1994 | Latimer et al. |
| 5,389,728 A | 2/1995 | Prejean |
| 5,532,350 A | 7/1996 | Cottrell et al. |
| 5,656,132 A | 8/1997 | Farrington, Jr. et al. |
| 5,853,867 A | 12/1998 | Harada et al. |
| 5,911,937 A | 6/1999 | Hekal |
| 5,932,668 A | 8/1999 | Friebe et al. |
| 5,945,476 A | 8/1999 | Roesler et al. |
| 6,013,855 A | 1/2000 | McPherson et al. |
| 6,020,071 A | 2/2000 | Watson |
| 6,020,171 A | 2/2000 | Saito et al. |
| 6,054,523 A | 4/2000 | Braun et al. |
| 6,110,533 A | 8/2000 | Cote et al. |
| 6,183,872 B1 | 2/2001 | Tanaka et al. |
| 6,200,684 B1 | 3/2001 | Yamaguchi et al. |
| 6,403,857 B1 | 6/2002 | Gross et al. |
| 6,417,425 B1 | 7/2002 | Whitmore et al. |

(Continued)

FOREIGN PATENT DOCUMENTS

CA          756190          4/1967

(Continued)

*Primary Examiner*—Robert D. Harlan
(74) *Attorney, Agent, or Firm*—Smith Moore LLP

(57) ABSTRACT

A process of making the flexible superabsorbent binder polymer composition includes preparing a preneutralized monomer solution having at least about 40 mol % degree of neutralization, preparing a monomer solution including monoethylenically unsaturated monomers, one of which includes an alkyloxysilane functionality, preparing initiator system solutions and adding the solutions to the monomer solution, mixing the foregoing solutions into a polymerization solution, cooling the polymerization solution, and post neutralizing the polymer.

26 Claims, No Drawings

U.S. PATENT DOCUMENTS

| | | |
|---|---|---|
| 6,458,877 B1 | 10/2002 | Ahmed et al. |
| 6,534,572 B1 | 3/2003 | Ahmed et al. |
| 6,596,402 B2 | 7/2003 | Soerens et al. |
| 6,737,491 B2 | 5/2004 | Soerens et al. |
| 2002/0049417 A1 | 4/2002 | Onishi et al. |
| 2002/0090453 A1 | 7/2002 | Muthiah et al. |
| 2002/0132540 A1 | 9/2002 | Soerens et al. |
| 2004/0018365 A1 | 1/2004 | Krautkramer et al. |
| 2004/0018366 A1 | 1/2004 | George et al. |
| 2004/0019166 A1 | 1/2004 | Soerens et al. |
| 2004/0019168 A1 | 1/2004 | Soerens et al. |
| 2004/0019339 A1 | 1/2004 | Renganathan et al. |
| 2004/0024092 A1 | 2/2004 | Soerens et al. |
| 2004/0043688 A1 | 3/2004 | Soerens et al. |
| 2004/0106721 A1 | 6/2004 | Soerens |
| 2004/0116014 A1 | 6/2004 | Soerens et al. |
| 2004/0116885 A1 | 6/2004 | Soerens et al. |
| 2004/0122390 A1 | 6/2004 | Soerens et al. |

FOREIGN PATENT DOCUMENTS

| | | |
|---|---|---|
| EP | 0132910 | 2/1985 |
| EP | 0475664 | 3/1992 |
| EP | 0705861 | 4/1996 |
| EP | 0844265 | 5/1998 |
| EP | 0992252 | 4/2000 |
| EP | 1013291 | 6/2000 |
| EP | 1059320 | 12/2000 |
| EP | 1199059 | 4/2002 |
| WO | WO 99/57201 | 11/1999 |
| WO | WO 02/053664 | 7/2002 |
| WO | 2005061015 A1 | 7/2005 |

METHOD FOR PREPARING A FLEXIBLE SUPERABSORBENT BINDER POLYMER COMPOSITION

This utility application is a continuation-in-part of application Ser. No. 11/293,043 filed Dec. 2, 2005, now U.S. Pat. No. 7,312,286.

BACKGROUND

This invention is directed to a flexible superabsorbent binder polymer composition and a polymerization method of making the flexible superabsorbent binder polymer composition.

Adhesives or binders are a necessary element of many absorbent products. While adhesives beneficially hold products together, adhesives may also have a tendency to interfere with the absorbency of fluids in absorbent products. Adhesives are typically hydrophobic and therefore are not conducive to absorbency or liquid transfer functions. Furthermore, most adhesives are non-absorbent and thus serve no liquid retention function.

Hydrophilic adhesives include adhesives formulated from water-soluble polymers such as poly(vinyl alcohol), poly(vinyl methyl ether), poly(vinyl pyrrolidone), poly(ethylene oxide), or cellulose derivatives such as hydroxypropyl cellulose. Dextrans, starches, and vegetable gums have been used to provide hydrophilic adhesives. These materials provide adhesion under dry conditions. However, upon exposure to aqueous fluids, these materials lose bonding capability because they are substantially soluble in aqueous fluids.

A known approach for making hydrophilic adhesives more functional upon exposure to aqueous fluid is to crosslink water-soluble polymers. As a result of crosslinking, the material becomes swellable and no longer soluble in aqueous fluid. However, since crosslinked polymers are thermosets, they are difficult to apply to substrates or to establish intimate contact with surfaces because the crosslinked polymers are solid materials and have little or no ability to flow. Usually, crosslinked polymers are hard, rigid, and brittle. These polymers do not have flexibility that many absorbent products need for end uses of the polymers.

Most existing binders have little or no absorbency. What is therefore needed is a binder polymer that also acts as an absorbent adding additional absorbency to the application. Herein, the binder polymer having these characteristics is referred to as a flexible superabsorbent binder polymer composition, which may be referred to as flexible absorbent binder or FAB herein, for use in a hydrophilic flexible binder or coating that has latent crosslinking capability. Such a superabsorbent polymer composition could be easily applied, like a water-soluble polymer, since the hydrophilic polymer solution would be capable of flow prior to crosslinking. Latent crosslinking capability would also provide a simple means of crosslinking the polymer after the polymer has established intimate contact with substrates or has formed a desired final shape or form.

Soerens et al., in U.S. Pat. No. 6,737,491, describes an absorbent binder composition including a monoethylenically unsaturated polymer and an acrylate or methacrylate ester that contains an alkoxysilane functionality that is particularly suitable for use in manufacturing absorbent articles. Also described in Soerens et al. is a method of making the absorbent binder composition that includes the steps of preparing a monomer solution, adding the monomer solution to an initiator system, and activating a polymerization initiator within the initiator system reported as an alcohol-based, water-soluble binder composition.

One of the issues in preparing water-soluble polymers is the amount of the residual monoethylenically unsaturated monomer content remaining in the polymer. For applications in personal hygiene, it is required that the amount of residual monoethylenically unsaturated monomer content of the superabsorbent polymer composition be less than about 1000 ppm.

In addition to the foregoing, another aspect of the existing flexible absorbent binder composition is that a relatively dilute polymer solution must be used so that the solution does not begin to crosslink, wherein crosslinking is known as gelling. Since the solution is generally used by applying the solution to a substrate and then drying the solution to form the crosslinked, absorbent coating, the cost of drying a dilute solution may be more costly than desirous.

In the case of using alkoxysilane as a crosslinking agent, gelling can be explained, without this invention being limited, by the following theory. As a function of the statistical probability, the alkoxysilane functional units on two polymer chains "find" each other in solution to allow condensation and formation of a crosslink. One approach is to keep this probability low by using a polymer concentration of about 20% by weight. Another approach is to reduce the probability of gellation by reducing the amount of alkoxysilane functionality incorporated into the polymer. For example, a simple approximation suggests that incorporating half as much alkoxysilane into the polymer should allow the polymer concentration to be doubled. Thus, a 40% polymer solution with half the alkoxysilane incorporation should have the same stability as a 20% solution of flexible superabsorbent binder polymer composition. However, the 40% solution requires much less energy, and cost, to dry the solution into an absorbent coating.

What is therefore needed is a hydrophilic polymer that has latent crosslinking capability and can be produced at an attractive cost. Such polymers could be easily applied, like a water-soluble polymer, since the hydrophilic polymer would be capable of flow prior to crosslinking. Latent crosslinking capability would also provide a simple means of crosslinking the polymer after the polymer has established intimate contact with substrates or has formed a desired final shape or form. There is also a need or desire for such a polymer which has a suitable level of flexibility.

In addition, there is a need within the field of absorbent products for flexible absorbent binders, adhesives, or coatings from a polymer solution, wherein the superabsorbent polymer composition has a residual monoethylenically unsaturated monomer of less than about 1,000 ppm, such as less than about 700 ppm. It is an objective of the present invention to increase the solids content of the polymer solution to at least about 24%, and such as at least about 30%. Another objective of the present invention is to have a viscosity after 16 hours (from the completion of polymerization) of the superabsorbent polymer composition of less than about 10,000 cps, such as in the range of from about 500 cps to about 5,000 cps.

The color and viscosity stability of a flexible superabsorbent binder polymer composition, as well as the performance of the coated substrate, may also require improvement. In order to achieve such an improvement, an alternative method of making the flexible superabsorbent binder polymer composition is desired.

Furthermore, there is a need within the field of absorbent products for such flexible absorbent binders, adhesives, or coatings that can be prepared by post-application, moisture-induced crosslinking of superabsorbent polymers.

SUMMARY

In response to the needs in the field of superabsorbent polymers, a new flexible superabsorbent binder polymer composition, useful as a flexible binder, adhesive, or coating material, is the subject matter of this application. The new flexible superabsorbent binder polymer composition has binder and absorbency characteristics. The superabsorbent polymer composition includes a binder polymer that has the capability of post-application, moisture-induced crosslinking, and a residual monoethylenically unsaturated monomer content of less than about 1,000 ppm. This capability provides for absorbent products having greater use in hygiene products.

A polymerization method was discovered that resulted in a suitable flexible superabsorbent binder polymer composition with improved viscosity stability and performance characteristics. In the polymerization method as set forth herein, a flexible superabsorbent binder polymer composition may be made in water by a process including the steps of a) preparing a preneutralized monomer solution; b) adding a mixture of low molecular weight polyolefinic glycols having a molecular weight from about 200 to about 10,000, and an ethylenically unsaturated monomer containing a trialkoxysilane functional group to the preneutralized monomer solution; c) preparing at least 2 initiator system solutions; d) adding monomer solution mixture of step b) and the initiator system solutions of step c) to water wherein the mixture reacts to form a polymer; e) optionally adding the at least 2 initiator solutions of step c) beyond monomer solution addition at an accelerated flow rate; f) cooling the polymer; and g) post-neutralizing the cooled polymer of step f) to increase the neutralization of the polymer to at least about 60 mol %.

With the foregoing in mind, it is a feature and advantage of the invention to provide a method of making the flexible binder polymer solution and coating composition.

DEFINITIONS

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

The term "absorbent article" generally refers to a device that can absorb and contain fluids. For example, personal care absorbent articles refer to devices that are placed against or near the skin to absorb and contain the various fluids discharged from the body. The term "disposable" is used herein to describe absorbent articles that are not intended to be laundered or otherwise restored or reused as an absorbent article after a single use. Examples of such disposable absorbent articles include, but are not limited to, personal care absorbent articles, health/medical absorbent articles, and household/industrial absorbent articles.

The term "binder" includes materials that are capable of attaching themselves to a substrate or are capable of attaching other substances to a substrate.

The term "knife over roll coating" refers to a process in which a knife is positioned, with a specified gap, above a substrate that is moving beneath the knife on a moving roll. In this manner, the knife spreads a specified thickness of coating material onto the substrate.

The term "monomer(s)" as used herein includes monomers, oligomers, polymers, mixtures of monomers, and any other reactive chemical species that is capable of co-polymerization with monoethylenically unsaturated carboxylic, sulphonic, or phosphoric acid or salts thereof.

The terms "nonwoven" and "nonwoven web" refer to materials and webs or materials having a structure of individual fibers or filaments that are interlaid, but not in an identifiable manner as in a knitted fabric. The terms "fiber" and "filament" are used interchangeably. Nonwoven fabrics or webs have been formed from many processes such as, for example, melt blowing processes, spun bonding processes, air laying processes, and bonded carded web processes. The basis weight of nonwoven fabrics is usually expressed in ounces of material per square yard (osy) or grams per square meter (gsm), and the fiber diameters are usually expressed in microns. (Note that to convert from osy to gsm, multiply osy by 33.91.)

The term "polymers" includes, but is not limited to, homopolymers, copolymers, such as for example, block, graft, random, and alternating copolymers, terpolymers, etc., and blends and modifications thereof. Furthermore, unless otherwise specifically limited, the term "polymer" shall include all possible configurational isomers of the material. These configurations include, but are not limited to, isotactic, syndiotactic, and atactic symmetries.

The term "roll printing" or "roll coating" refers to a process in which the application of a deposited material, generally as a paste, onto a substrate is carried out by transferring the deposited material from a roll onto the substrate in a more or less uniform layer using one or more rolls, which may be engraved, and a pool cylinder. A doctor blade is used to scrape any excess deposited material from the rolls or substrate. The doctor blade may be flat or have a patterned edge such as slots or ridges.

The term "solution," when used in the phrase "flexible superabsorbent binder polymer solution," and derivatives thereof, refers to a polymer solution that has not yet been substantially crosslinked (i.e., a precursor) but will result in the flexible superabsorbent binder polymer composition once crosslinking occurs.

The term "spontaneous crosslinking" refers to crosslinking, which occurs without radiation, catalysis, or any other inducement other than the specified temperature of not more than about 150° C., such as not more than about 120° C., or not more than about 100° C.

The term "superabsorbent" refers to a water-swellable, water-insoluble organic or inorganic material capable, under the most favorable conditions, of absorbing at least about 10 times its weight or at least about 15 times its weight in an aqueous solution containing 0.9 weight percent sodium chloride. The superabsorbent materials can be natural, synthetic, and modified natural polymers and materials. In addition, the superabsorbent materials can be inorganic materials, such as silica gels, or organic compounds such as cross-linked polymers.

DETAILED DESCRIPTION

The present invention includes a method of making and applying such a flexible superabsorbent binder polymer composition. The flexible superabsorbent binder polymer composition may be used in absorbent binder composition that can provide fluid retention properties in addition to adhesive properties. Thus, the flexible superabsorbent binder polymer composition is particularly suitable for use in forming absorbent products. Flexible superabsorbent binder polymer composition may be referred to herein as composition or as superabsorbent polymer composition.

More specifically, the flexible superabsorbent binder polymer composition is made in water by a polymerization process including the steps of a) preparing a preneutralized monomer solution; b) adding a mixture of low molecular weight polyolefinic glycols having a molecular weight from about 200 to about 10,000, and an ethylenically unsaturated monomer containing a trialkoxysilane functional group to the preneutralized monomer solution; c) preparing at least 2 initiator system solutions; d) adding the monomer solution mixture of step b) and the initiator system solutions of step c) separately wherein the mixture reacts to form a polymer; e) optionally adding the at least 2 initiator solutions of step c) beyond monomer solution addition at an accelerated flow rate than that used in step d); f) cooling the polymer; and g) post-neutralizing the cooled polymer of step f) to increase the neutralization of the polymer to at least about 60 mol %.

Suitable monomers that may be included to make a suitable superabsorbent polymer solution include carboxyl group-containing monomers: for example monoethylenically unsaturated mono or poly-carboxylic acids, such as (meth)acrylic acid (meaning acrylic acid or methacrylic acid; similar notations are used hereinafter), maleic acid, fumaric acid, crotonic acid, sorbic acid, itaconic acid, and cinnamic acid; carboxylic acid anhydride group-containing monomers: for example monoethylenically unsaturated polycarboxylic acid anhydrides (such as maleic anhydride); carboxylic acid salt-containing monomers: for example water-soluble salts (alkali metal salts, ammonium salts, amine salts, and the like) of monoethylenically unsaturated mono- or poly-carboxylic acids (such as sodium (meth)acrylate, trimethylamine (meth)acrylate, triethanolamine (meth)acrylate), sodium maleate, methylamine maleate; sulfonic acid group-containing monomers: for example aliphatic or aromatic vinyl sulfonic acids (such as vinylsulfonic acid, allyl sulfonic acid, vinyltoluenesulfonic acid, styrene sulfonic acid), (meth)acrylic sulfonic acids [such as sulfopropyl(meth)acrylate, 2-hydroxy-3-(meth)acryloxy propyl sulfonic acid]; sulfonic acid salt group-containing monomers: for example alkali metal salts, ammonium salts, amine salts of sulfonic acid group containing monomers as mentioned above; and/or amide group-containing monomers: vinylformamide, (meth)acrylamide, N-alkyl(meth)acrylamides (such as N-methylacrylamide, N-hexylacrylamide), N,N-dialkyl(meth)acryl amides (such as N,N-dimethylacrylamide, N,N-di-n-propylacrylamide), N-hydroxyalkyl (meth)acrylamides [such as N-methylol(meth)acrylamide, N-hydroxyethyl(meth)acrylamide], N,N-dihydroxyalkyl (meth)acrylamides [such as N,N-dihydroxyethyl(meth)acrylamide], vinyl lactams (such as N-vinylpyrrolidone).

The amount of monoethylenically unsaturated carboxylic, sulphonic, or phosphoric acid or salts thereof relative to the weight of the flexible superabsorbent binder polymer composition may range from about 15% to about 99.9% by weight. In some aspects, the levels of monoethylenically unsaturated carboxylic, sulphonic, or phosphoric acid or salts thereof may be between about 25% and about 99.9% by weight of the flexible superabsorbent binder polymer composition, such as between about 25% and about 90% by weight of the flexible superabsorbent binder polymer composition, or between about 30% and about 80% by weight of the flexible superabsorbent binder polymer composition; or between about 50% and about 70% by weight of the flexible superabsorbent binder polymer composition for some intended uses.

The acid groups are initially neutralized to the extent of at least about 40 mol %, that is, the acid groups are preferably present as sodium, potassium, or ammonium salts. It is preferred to obtain polymers obtained by polymerization of acrylic acid or methacrylic acid, the carboxyl groups of which are neutralized to the extent of about 60 mol %, in the presence of internal crosslinking agents. The neutralization can be accomplished by neutralizing the monomer solution before mixture up to at least 40 mol %, and post neutralization of the polymer so that the polymer has at least 60 mol % neutralization.

Organic monomers capable of co-polymerization with monoethylenically unsaturated carboxylic, sulphonic, or phosphoric acid or salts thereof, which monomers contain a trialkoxysilane functional group or a moiety that reacts with water to form a silanol group, are useful in the practice of this invention. The trialkoxysilane functional group has the following structure:

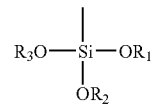

wherein $R_1$, $R_2$, and $R_3$ are alkyl groups independently having from 1 to 6 carbon atoms.

Ethylenically unsaturated monomers containing a trialkoxysilane functional group are appropriate for this invention and are desired. Desired ethylenically unsaturated monomers include acrylates and methacrylates, such as acrylate or methacrylate esters that contain an alkoxysilane functionality. A particularly desirable ethylenically unsaturated monomer containing a trialkoxysilane functional group is methacryloxypropyl trimethoxy silane, commercially available from Dow Corning® (having a place of business in Midland, Mich., U.S.A) under the trade designation Z-6030 Silane and from Degussa (a business having offices in Parsippany, N.J., U.S.A.), under the trade name DYNASYLAN® MEMO. Other suitable ethylenically unsaturated monomers containing a trialkoxysilane functional group include, but are not limited to, methacryloxyethyl trimethoxy silane, methacryloxypropyl triethoxy silane, methacryloxypropyl tripropoxy silane, acryloxypropylmethyl dimethoxy silane, 3-acryloxypropyl trimethoxy silane, 3-methacryloxypropylmethyl diethoxy silane, 3-methacryloxypropylmethyl dimethoxy silane, and 3-methacryloxypropyl tris(methoxyethoxy)silane. However, it is contemplated that a wide range of vinyl and acrylic monomers having trialkoxysilane functional groups or a moiety that reacts easily with water to form a silanol group, such as a chlorosilane or an acetoxysilane, provide the desired effects and are effective monomers for copolymerization in accordance with the present invention.

Whereas most superabsorbent polymers require addition of an internal crosslinker to reinforce the polymer, the flexible superabsorbent binder polymer composition of the present invention does not require the addition of a crosslinking agent because the organic monomers including the trialkoxysilane functional act as an internal crosslinker. The internal crosslinker allows the superabsorbent binder polymer composition to be formed by coating the water-soluble precursor polymer onto the substrate and then removing the water to activate the latent crosslinker.

In addition to monomers capable of co-polymerization that contain a trialkoxysilane functional group, it is also feasible to use a monomer capable of co-polymerization that can subsequently be reacted with a compound containing a trialkoxysilane functional group, or a moiety that reacts with water to form a silanol group can also be used. Such a monomer may contain, but is not limited to, an amine or an alcohol. An amine group incorporated into the co-polymer may subsequently be reacted with, for example, but not limited to, (3-chloropropyl)trimethoxysilane. An alcohol group incorporated into the co-polymer may subsequently be reacted with, for example, but not limited to, tetramethoxysilane.

The amount of organic monomer having trialkoxysilane functional groups or silanol-forming functional groups relative to the weight of the polymeric binder composition may range from about 0.1% to about 15% by weight. Suitably, the amount of monomer should exceed 0.1% by weight in order provide sufficient crosslinking upon exposure to moisture. In some aspects, the monomer addition levels are between about 0.1% and about 20% by weight of the flexible superabsorbent binder polymer composition, such as, between about 0.5% and about 10% by weight of the flexible superabsorbent binder polymer composition; or between about 0.5% and about 5% by weight of the flexible superabsorbent binder polymer composition for some intended uses. The flexible superabsorbent binder polymer composition can include a copolymerizable hydrophilic glycol containing an ester monomer, for example a long chain, hydrophilic monoethylenically unsaturated esters, such as poly(ethylene glycol) methacrylate having from 1 to 13 ethylene glycol units. The hydrophilic monoethylenically unsaturated esters have the following structure:

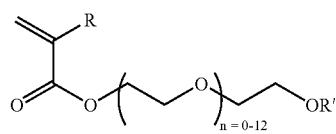

R=H or CH$_3$
R'=H, alkyl, phenyl

The amount of monoethylenically unsaturated hydrophilic esters relative to the weight of the polymeric binder composition thereof may range from 0 to about 75% by weight of monomer to the weight of the flexible superabsorbent binder polymer composition. In some aspects, the monomer addition levels are between about 10% and about 60% by weight of the flexible superabsorbent binder polymer composition; such as between about 20% and about 50% by weight of the flexible superabsorbent binder polymer composition; or between about 30% and about 40% by weight of the flexible superabsorbent binder polymer composition for some intended uses.

In some aspects, the flexible superabsorbent binder polymer composition may also include a hydrophilic plasticizer. Suitable hydrophilic plasticizers that may be used include, but are not limited to, a polyhydroxy organic compounds such as glycerin, and a low molecular weight polyolefinic glycols such as polyethylene glycol (PEG) of molecular weight range from about 200 to about 10,000.

The amount of plasticizer relative to the weight of the flexible superabsorbent binder polymer composition thereof may range from 0 to about 75% by weight of plasticizer to the weight of the flexible superabsorbent binder polymer composition. In some aspects, the plasticizer addition levels are from about 10% to about 60% by weight of the flexible superabsorbent binder polymer composition; such as from about 10% to about 40% by weight of the flexible superabsorbent binder polymer composition for some intended uses.

In some aspects, the flexible superabsorbent binder polymer composition of the present invention may be made from monomers that include at least 15% by weight monoethylenically unsaturated monomer selected from carboxylic acid, carboxylic acid salts, sulphonic acid, sulphonic acid salts, phosphoric acid, or phosphoric acid salts; an initiator system; and an acrylate or methacrylate ester that contains a group readily transformed into a silanol functionality by subsequent reaction with water, wherein the said resulting flexible superabsorbent binder polymer composition has an average molecular weight of from about 100,000 to about 650,000 g/mol, such as about 100,000 to about 300,000 g/mol, and the superabsorbent polymer composition has a viscosity of less than about 10,000 cps and a residual monoethylenically unsaturated monomer content of less than about 1,000 ppm.

One advantage of the flexible superabsorbent binder polymer composition of the present invention is that it provides a water-soluble ionic polymer capable of sufficient spontaneous crosslinking within about 10 minutes, such as less than about 5 minutes, or less than about 1 minute, at a web temperature not more than about 150° C., to provide the flexible absorbent binder layer with an absorbent capacity of at least one (1) gram of fluid per gram of flexible superabsorbent binder polymer composition, such as at least three (3) grams of fluid per gram of flexible superabsorbent binder polymer composition, using the Centrifuge Retention Capacity Test (described below).

The crosslinking at web temperatures not more than about 150° C., such as not more than about 120° C., or not more than about 100° C., permits the flexible superabsorbent binder polymer composition to be applied to one or more substrate layers, and then crosslinked, without degrading or damaging the substrate. Significant crosslinking occurs within about 10 minutes, such as within about 8 minutes, or within about six minutes, to provide an efficient, commercially feasible, cost-effective crosslinking process. The crosslinking may then continue until a flexible superabsorbent binder polymer composition having the desired absorbent capacity is obtained. The ionic polymer may bear a positive charge, a negative charge, or a combination of both, and should have an ionic unit content of about 15 mol % or greater. The ionic polymer may include a variety of monomer units described below.

The superabsorbent polymer composition may be prepared by mixing an initiator system with a monomer solution, at a suitable temperature, for thermal initiators to generate free radicals, for example, at temperatures between about 50° C. and about 90° C. Lower temperatures can be used for redox initiator systems or redox initiator system solutions. An initiator system solution may be prepared by dissolving an initiator in a solvent. Initiators are used to start the polymerization of a monomer. The action of an initiator is similar to that of a catalyst, except that the initiator is generally consumed in the reaction. Possible solvents include, but are not limited to, water and alcohols such as ethanol. A variety of initiators may be useful in the practice of this invention. The polymerization initiator system may be activated using a variety of methods including, but not limited to, thermal energy, radiation, redox chemical reactions, thermal initiators, and other methods known in the art.

One suitable class of initiators is organic peroxides and azo compounds, with benzoyl peroxide and azobisisobutyronitrile (AIBN), as examples. Examples of suitable initiators include t-amylperoxypivalate; 2,2'-Azobis(2,4'-dimethylvaleronitrile) (V65B), sodium persulfate (NaPS); and 2,2'-azobis-2-amidinopropanedihydrchloride (ABAH). Suitable amounts of initiators depend upon the particular initiator. Examples include, but are not limited to at least about 0.003 mol/mol of t-amylperoxypivalate; at least about 0.01 mol/mol of 2,2'-Azobis(2,4'-dimethylvaleronitrile); at least about 200 ppm of sodium persulfate; and at least about 200 ppm of 2,2'-azobis-2-amidinopropanedihydrchloride.

Compounds containing an O—O, S—S, or N=N bond may be used as thermal initiators. Compounds containing O—O bonds; i.e., peroxides, are commonly used as initiators for polymerization. Examples of peroxide initiators include: alkyl, dialkyl, diaryl and arylalkyl peroxides such as cumyl peroxide, t-butyl peroxide, di-t-butyl peroxide, dicumyl peroxide, cumyl butyl peroxide, 1,1-di-t-butyl peroxy-3,5,5-trimethylcyclohexane, 2,5-dimethyl-2,5-di(t-butylperoxy)hexane, 2,5-dimethyl-2,5-bis(t-butylperoxy)hexyne-3 and bis(a-t-butyl peroxyisopropylbenzene); acyl peroxides such as acetyl peroxides and benzoyl peroxides; hydroperoxides such as cumyl hydroperoxide, t-butyl hydroperoxide, p-methane hydroperoxide, pinane hydroperoxide and cumene hydroperoxide; peresters or peroxyesters such as t-butyl peroxypivalate, t-amylperoxypivalate, t-butyl peroctoate, t-butyl perbenzoate, 2,5-dimethylhexyl-2,5-di(perbenzoate) and t-butyl di(perphthalate); alkylsulfonyl peroxides; dialkyl peroxymonocarbonates; dialkyl peroxydicarbonates; sodium persulfate, 2,2'-Azobis(2,4'-dimethylvaleronitrile), 2,2'-azobis-2-amidinopropanedihydrchloride,diperoxyketals; ketone peroxides such as cyclohexanone peroxide and methyl ethyl ketone peroxide. In one particular aspect of the present invention, an organic initiator, t-amylperoxypivalate (TAPP), which decomposes very fast to form a stable ethyl ($CH_3CH_2$.) free radical, was utilized to reduce the residual monoethylenically unsaturated monomer significantly.

A redox initiator system where free radicals are generated by oxidation-reduction reactions without the application of heat can be used for the polymerization of the monomer solution to make the flexible superabsorbent binder polymer composition. In this method, polymerization is started by adding either one of oxidizing or reducing components of the initiator system to the rest of the solution mixture of monomers and other components of the redox initiator system. Suitable oxidizing components of the redox initiator system include, but are not limited to, hydrogen peroxide, alkali metal persulfates, ammonium persulfate, alkalihydroperoxides, peresters, diacryl peroxides, silver salts, and combinations thereof.

Suitable reducing components of the initiator system include, but are not limited to, ascorbic acid, alkali metal sulfites, alkali metal bisulfites, ammonium sulfite, ammonium bisufite, alkali metal hydrogen sulfites, ferrous metal salts such as ferrous sulfates, sugars, aldehydes, primary and secondary alcohols, and combinations thereof. A combination of redox and thermal initiators can also be used. A redox initiator system that comprises hydrogen peroxide, ferrous sulfate, and ascorbic acid coupled with thermal initiator sodium persulfate (NaPS) was found to be able to reduce residual monoethylenically unsaturated monomer significantly in aqueous polymerization of the present invention while yielding weight average molecular weight of superabsorbent polymer in the target range of about 100,000 to about 650,000 g/mol, such as about 1,000,000 to about 300,000 g/mol.

In addition, it has been found that a redox initiator system comprising a mole ratio of oxidizing agent to reducing agent from about 6:1 to about 2:1, a mole ratio of 4:1, and a mole ratio of 2:1 were found to result in a reduction of residual monoethylenically unsaturated monomer significantly in the aqueous polymerization of the present invention.

A chain transfer agent that can limit the polymer chain growth during the polymerization and thereby can control the molecular weight and viscosity of flexible binder polymer solution may additionally be used in the polymerization solution. Suitable chain transfer agents include, but are not limited to, alcohols such as isopropyl alcohol, organic acids such as formic acid, inorganic acids such as hypophosphorus acid, organic amines such as triethylamine, and combinations thereof. In one aspect, hypophosphorus acid was found to be an effective chain transfer agent for the flexible superabsorbent binder polymer composition.

The amount of chain transfer agent relative to the weight of monoethylenically unsaturated carboxylic, sulphonic, or phosphoric acid or salts monomers may range from 0.1 to about 20% by weight of the chain transfer agent to the weight of the monomers. In some aspects, the chain transfer agent addition levels are between about 5% and about 15% by weight of the monomer such as between about 2% and about 10% by weight of the monomer, or between about 0.5% and about 1% by weight of the monomer to obtain desired molecular weight and viscosity levels of the flexible superabsorbent binder polymer composition for some intended uses.

The method to make the flexible superabsorbent polymer composition of the present invention may further include a transition metal salt. Examples of some suitable transition metals for the transition metal salt include, but are not limited to, scandium, titanium, vanadium, chromium, manganese, iron, cobalt, nickel, copper, zinc, silver, and the like. For instance, a transition metal salt may be combined with the flexible superabsorbent binder polymer compositions before, during, and/or after its formation. For instance, some transition metal salts that may be used in the present invention include, but are not limited to, halides, such as iron chloride, copper chloride, sulfates, nitrates, acetates, oxalates, carbonates, and so forth. Iron sulfate may be used in the present invention.

The flexible superabsorbent binder polymer composition of the present invention may be applied to a substrate, such as for the purpose of adhering various components of an absorbent product to one another during the manufacturing process of absorbent products. Alternatively, the superabsorbent polymer composition may be applied to a substrate as a coating by itself, thereby serving as an absorbency additive. The flexible superabsorbent binder polymer composition may be applied to the substrate using any suitable application process, including knife over roll coating, or roll coating, either in a continuous coverage or a patterned coverage. Printing applications are other suitable application techniques, including gravure printing, screen, and jet printing. The flexible superabsorbent binder polymer composition may also be applied to the substrate using a spray application.

In some aspects of the present invention, a new source of crosslinking having silanol functionality may be added to the superabsorbent binder polymer composition just before the concentrated solution is applied to a substrate. The added source of silanol crosslinking functionality may in effect "activate" the solution for gellation as it is being applied to the substrate. Potential sources of silanol (Si—OH) functionality include, but are not limited to: silica nano particles, such as SNOWTEX® ST-40 (available from Nissan Chemical—America Corporation, a business having offices located in Houston, Tex., U.S.A.); silica aerosol particles, such as SYLOID® silica (available from Grace Davison, a division of W.R. Grace & Co., having a place of business in Columbia, Md., U.S.A.); clays with Si—OH surface, such as Kaolin, bentonite, or attapolgite; and zeolites. In addition, soluble sources of silanol can be added, such as silicates, or in the form of monomeric silanes that are readily hydrolyzed to silanols, such as, but not limited to, alkoxysilanes; for example, tetraethoxy silane (TEOS).

The source of silanol can be added in any suitable manner to provide sufficient mixing with the flexible superabsorbent binder polymer composition solution prior to coating onto the substrate. For example, two separate, metered, feed streams of the flexible superabsorbent binder polymer solution and silanol source may be combined at a Y-juncture with a down-stream static mixer in the flow line to provide mixing.

Suitable ranges may be any that provide for a stable solution at a polymer concentration greater than 25%. Alkoxysilane functionality is incorporated into a base flexible binder polymer solution at an acrylate to silane mole ratio of 170:1. Flexible superabsorbent binder polymer composition with 75%, 50% and 25% of base flexible binder polymer solution incorporation have been prepared. (Mole ratios of acrylate to silane in these polymers are 227:1, 340:1, and 680:1.)

Table 1 below shows the absorbent capacity data, based on the Centrifuge Retention Capacity Test (described below):

| Polymer composition | CRC g/g |
|---|---|
| Standard FAB: acrylate:Si—OH ratio 56:1 | 14.2 |
| 50% reduced alkoxysilane: acrylate to Si—OH ratio 112:1 | 21.4 |
| 50% reduced alkoxysilane: with kaolin added to reduce acrylate to Si—OH ratio to 20:1 | 15.1 |
| 50% reduced alkoxysilane: with syloid silica added to reduce acrylate to Si—OH ratio to 20:1 | 14.6 |
| 50% reduced alkoxysilane: with tetraethoxy silane added to reduce acrylate to Si—OH ratio to 20:1 | 17.1 |

As demonstrated in Table 1, reducing the alkoxysilane incorporation increased the Centrifuge Retention Capacity (CRC) due to lower crosslink density, compared to a base flexible superabsorbent binder polymer composition. Addition of sources of silanol, even to levels greater than a base flexible superabsorbent binder polymer composition, provides a higher CRC than a base flexible superabsorbent binder polymer composition, even with higher crosslinking potential. Once the flexible superabsorbent binder polymer composition is applied to the substrate, crosslinking can be moisture-induced by hydrolysis and condensation of alkoxysilanes. Activation by this method can take place during solvent removal or after solvent removal by exposure to air at ambient humidity. Solvent may be removed from the substrate either by evaporating the solvent or by any other suitable technique. Heat or radiation may be applied to increase the rate of the process. Recovery of the solvent is a part of the process, and methods for this are widely known to those skilled in the art.

In addition, modifying agents such as compatible polymers, plasticizers, colorants, and preservatives may be incorporated in the flexible superabsorbent binder polymer composition of the present invention.

In another aspect, a flexible superabsorbent binder polymer composition may be made in water by a process including the steps of a) preparing a preneutralized monomer solution having at least about 40 mol % degree of neutralization; b) adding a chain transfer agent to the pre-neutralized monomer solution; c) adding a mixture of low molecular weight polyolefinic glycols having a molecular weight from about 200 to about 10,000, and an ethylenically unsaturated monomer containing a trialkoxysilane functional group to the preneutralized monomer solution; d) preparing at least two initiator system solutions; e) adding monomer solutions mixture of step c) and the initiator system solutions of step d) separately, but simultaneously and continuously to a pre-calculated amount of water, wherein the mixture reacts to form a polymer; f) continue adding initiator solutions beyond monomer solution addition for a fixed period of time at an accelerated flow rate than that used in step e); g) cooling the polymer of step f); and h) post-neutralizing the cooled polymer of step g) to increase the neutralization of the polymer to at least about 60 mol %.

The flexible superabsorbent binder polymer composition of the process of the present invention can be used in the manufacture of absorbent products, thereby adding absorbent capacity to such absorbent products. Examples of such articles include training pants, diapers, diaper pants, feminine hygiene products including sanitary pads and napkins, as well as tampons and interlabial feminine hygiene products, swimwear, incontinence products, absorbent toweling, other personal care or health care garments, including medical garments, or the like. As used herein, the term "incontinence products" includes absorbent underwear for children, absorbent garments for children or young adults with special needs such as autistic children or others with bladder/bowel control problems as a result of physical disabilities, as well as absorbent garments for incontinent older adults.

TEST PROCEDURES

Residual Monoethylenically Unsaturated Monomer Test

The residual monoethylenically unsaturated monomer analysis is carried out using solid film obtained from the polymer solution or superabsorbent composition. By way of example for this test description, the monoethylenically unsaturated monomer is acrylic acid. High performance liquid chromatography (HPLC) with a SPD-10Avp Shimadzu UV detector (available from Shimadzu Scientific Instruments, having a place of business in Columbia, Md., U.S.A) is used to determine the residual acrylic acid monomer content. To determine the residual acrylic acid monomer, about 0.5 grams of cured film is stirred in 100 ml of a 0.9% NaCl-solution for 16 h using a 3.5 cm L×0.5 cm W magnetic stirrer bar at 500 rpm speed. The mixture is filtered, and the filtrate is then passed through a Nucleosil C8 100A reverse phase column (available from Column Engineering Incorporated, a business having offices located in Ontario, Calif., U.S.A.) to separate the acrylic acid monomer. The acrylic acid monomer elutes at a certain time with detection limit at about 10 ppm. The peak area of resulting elutes calculated from the chromatogram is then used to calculate the amount of residual acrylic acid monomer in the film. Initially, a calibration curve was generated by plotting the response area of pure acrylic acid elutes against its known amount (ppm). A linear curve with a correlation coefficient of greater than 0.996 was obtained.

16 Hr Extractable Test (%)

The following test methods are used to calculate the 16-hour extractable levels for the superabsorbent composition. The first test method is intended for use on carboxylic acid based superabsorbent materials. About 0.5 g of cure film obtained from the polymer solution is placed into a 250 ml conical flask containing 100 ml 0.9% NaCl solution. The mixture was stirred with a 3.5 cm L×0.5 cm W magnetic stirrer bar at 500 rpm speed for 16 hours. The sample is then filtered using WHATMAN #3 filter paper (available from Whatman, Inc., a business having offices located in Florham Park, N.J., U.S.A.) and an aspirator attached to a water faucet that creates a vacuum in the filtration unit by sucking air with running water. The entire solution is filtered and special care is taken to ensure that no fluid is lost and that no solid material passes through or around the filter paper. About 50 g of the filtered solution is then taken into a 100 ml beaker. The pH of the solution is adjusted to 8.5 stepwise by using 1.0N NaOH and 0.1N HCl. The resulting solution is titrated to pH 3.9 using the Brinkman Titoprocessor (available from Brinkmann Instruments, Inc., a business having offices located in Westbury, N.Y., U.S.A.). The results are calculated by weight basis, with a assumed sodium/hydrogen acrylate formula weight of 87.47. The formula weight is derived from that of 70% neutralized acrylic acid.

Centrifuge Retention Capacity (CRC) Test

As used herein, the Centrifugal Retention Capacity (CRC) is a measure of the Absorbent Capacity of the superabsorbent polymer composition retained after being subjected to centrifugation under controlled conditions. The CRC can be measured by placing a sample of the material to be tested into a water-permeable bag that will contain the sample while allowing the test solution (0.9 percent NaCl solution) to be freely absorbed by the sample. A heat-sealable tea bag material (available from Dexter Nonwovens of Windsor Locks, Conn., U.S.A., as item #11697) works well for most applications. The bag is formed by folding a 5-inch by 3-inch sample of the bag material in half and heat sealing two of the open edges to form a 2.5-inch by 3-inch rectangular pouch. The heat seals should be about 0.25 inch inside the edge of the material. After the sample is placed in the pouch, the remaining open edge of the pouch is also heat-sealed. Empty bags are also made to be tested with the sample bags as controls. A sample size is chosen such that the teabag does not restrict the swelling of the material, generally with dimensions smaller than the sealed bag area (about 2-inch by 2.5-inch). Three sample bags are tested for each material.

The sealed bags are submerged in a pan of 0.9 percent NaCl solution. After wetting, the samples remain in the solution for 60 minutes, at which time they are removed from the solution and temporarily laid on a non-absorbent flat surface.

The wet bags are then placed into the basket of a suitable centrifuge capable of subjecting the samples to a g-force of 350. (A suitable centrifuge is a Heraeus LABOFUGE 400, Heraeus Instruments, part number 75008157, available from Heraeus Infosystems GmbH, Hanau, Germany.) The bags are centrifuged at a target of 1600 rpm, but within the range of 1500-1900 rpm, for 3 minutes (target g-force of 350). The bags are removed and weighed. The amount of fluid absorbed and retained by the material, taking into account the fluid retained by the bag material alone, is the Centrifugal Retention Capacity of the material, expressed as grams of fluid per gram of material.

Viscosity After 16 Hours

Viscosity of the flexible binder polymer solution is measured using a Brookfield DVII+ Programmable viscometer (available from Brookfield Engineering, a business having offices located at Middleboro, Mass., U.S.A.). About 200-250 ml of binder composition is taken in a 25-ounce plastic cup. The viscometer is generally zeroed initially with a desired Spindle. For binder composition, Spindle Number 3 is used. The viscosity is measured at 20 RPM and at temperature 22±1° C.

Percent Solids

About 20±0.5 g of flexible superabsorbent binder polymer composition is accurately weighed (W1) into a tared (W2) hexagonal plastic weighing dish. Approximate internal diameter weighing dish is 5 inch/3.5 inch (Top/Base). The polymer composition-containing dish is placed in a fuming hood at room temperature for about 16-20 hours. The dish containing partially dried solid film is then placed into a laboratory oven pre-heated at 80° C. for 30 minutes. The dish and its content are allowed to cool to room temperature. The dried dish with resulting solid film is then weighed together (W3). The percent solids is calculated using the following formula:

% Solids=[($W3-W2$)/($W1-W2$)]×100

Determining Retention Capacities of Coated Substrate (GRC)

FAB performance characteristics are evaluated by measuring 0.9% saline absorbing liquid retention capacities of a coated non-woven substrate. The sample for the retention capacity measurement is prepared as follows: Approximately 50 g of FAB solution is poured onto a 10"×14" metal cookie dish. FAB solution is rolled out with a paint roller until the solution is evenly spread across the dish and paint roller is saturated with FAB solution. Then a 8"×12" sheet of spun-bond substrate is placed on top of FAB cookie dish. The substrate is coated with FAB saturated pain roller until it is thoroughly coated and assumes a transparent appearance. The coated substrate is then placed on a plastic screen and dried in a laboratory convection oven, Lindberg/Blue M Model M01460SA-1 at 105° C. for 15 minutes. The dried coated substrate is removed from the oven after drying period and immediately cut into 1.75" circles by a circular die. The circles are immediately placed into a plastic bag to prevent absorption of ambient moisture.

The retention capacity is measured as follows. For each FAB sample, the retention capacity of four coated circles is determined and averaged the results. For each determination, initial weight of the circle is recorded (W1). A glass dish is filled with 0.9% saline solution. The level of the saline solution should be approximately 4 cm high. A timer is set for 20 minutes. The coated circles are placed on the surface of the test liquid and gently manipulated to immerse, and the timer is started. The circles are removed from the test liquid after 20 minutes and placed onto a polypropylene back sheet. The wet circles are placed at least half an inch apart from each other. Then another uncoated spun-bond sheet is placed on top of the coated circles. The back sheet/circle/spun-bond assembly is then placed onto the table of a suction box and covered the assembly with the plastic top sheet. The suction box timer is set to five minutes and 15 seconds. The suction box controller and vacuum pump are then turned on. The pressure should read 14±1 inches of water. This yields a net pressure of 0.5 psi. When the timer sounds, the silence button is pressed, and the plastic cover is lifted up. The back sheet/circle/spun-bond assembly is carefully removed, and the upper spun-bond layer is also removed. Each circle is carefully removed and weighed individually (W2).

Calculation:

Gross Adjusted Retention Capacity (GRC), g/g=
(W2−W1)/W1

Net Adjusted Retention Capacity (NRC), g/g=(W2−W1)/(W1−0.0263)

W1=Initial weight of coated circle
W2=Weight of wet coated circle after suction box 0.0263=A factor for uncoated dry circle weight

EXAMPLES

The following examples are provided to illustrate the invention and do not limit the scope of the claims. Unless otherwise stated, all parts and percentages are by weight.

Comparative Example 1

A flexible absorbent binder solution of this comparative example was prepared by a two-step polymerization method wherein an equal amount of the latent cross-linker, 3-(trimethoxysilyl)propyl methacrylate (MEMO), was used in the both steps of the polymerization.

Step 1

Monomer preparation was carried out as follows: Into a 100-gallon jacketed stainless steel pilot plant reactor equipped with electrical motor driven agitator, about 317 pounds (LB) of water was added by a pump. To this water, 61.3 LB of glacial acrylic acid was added. Then, 40.8 LB of 50% aqueous NaOH was added by a pump, and the mixture was stirred. The solution mixture was cooled to about 27° C.

Initiator solutions were prepared as follows: 1) 1.55 LB 35% $H_2O_2$ was weighed out; 2) 1.61 LB SEB (sodium erythorbate) was dissolved in 17 LB water; and 3) 0.26 LB NaPS (sodium persulfate) was dissolved in 2 LB water.

The chain transfer agent, cross-linker and plasticizer were prepared as follows: 1) 0.80 LB of 50% hypophosphorous acid was weighed out; and 2) 1.13 LB of 3-(trimethoxysilyl)propyl methacrylate (MEMO) was added to 9.0 LB PEG400, and the mixture was stirred to form a homogeneous solution.

When the monomer solution reached temperature 27° C., an oxygen stripping process sequence began. First, a vacuum on the reactor was pulled, and then the reactor was blanketed with nitrogen gas, followed by 3-5 minutes stirring before pulling vacuum again. This process was repeated three times. After the oxygen stripping process, the initiation sequence began. To the monomer solution were added the hydrogen peroxide solution, the NaPS solution, hypophosphorous acid solution, the MEMO/PEG mixture, and finally the SEB solution. The solution was stirred, and the reaction exotherm was monitored through a digital readout. When the reaction reached $T_{max}$ (~50-55° C.), 37 LB water was added to the resulting polymer solution. The polymer solution was allowed to cool slowly to 25° C. using cooling water while stirring was continued.

Step 2

When the polymer solution reached 25-27° C., the reactor was sparged with air before adding a second monomer charge to prevent autopolymerization. While the reactor was sparging with air, 20.4 LB of the remaining 61.3 LB glacial acrylic acid was added to the reactor, followed by the addition of 13.6 LB of the remaining 40.8 LB 50% NaOH, such that the batch temperature did not exceed 35° C. This process was repeated two more times to complete the neutralization of all remaining acrylic acid monomer. This solution mixture was allowed to cool down to 27° C.

The remaining initiator solutions were prepared by weighing out 1.55 LB 35% $H_2O_2$; dissolving 0.26 LB NaPS (sodium persulfate) in 2 LB water; dissolving 0.0026 LB $Fe(SO_4)_3 \cdot 7H_2O$ in 5 LB deionized water; and dissolving 1.61 LB SEB (sodium erythorbate) in 17 LB water. The remaining chain transfer agent, cross-linker, and plasticizer were prepared by weighing out 0.80 LB of 50% hypophosphorous acid and dissolving 1.13 LB of 3-(trimethoxysilyl) propyl methacrylate (MEMO) in 9.0 LB PEG400.

When the temperature of the reaction mixture reached 27° C., the oxygen stripping process began by a similar process to that described in Step 1. After the oxygen stripping process, the second polymerization was initiated. In the second polymerization step, the hydrogen peroxide solution, NaPS solution, hypophosphorous acid solution, MEMO/PEG mixture, iron sulfate solution, and finally the SEB solution were added manually to the polymer/monomer solution mixture. The polymer/solution mixture was stirred, and the reaction isotherm was monitored through a digital readout. After the reaction reached $T_{max}$, 37 LB water was added to the resulting polymer solution. The polymer solution was allowed to cool slowly to below 30° C. using cooling water while stirring was continued. Then, to bring the final degree of neutralization of resulting flexible absorbent binder polymer solution to 77%, 23.1 LB 50% NaOH followed by 10 LB of water was added with care so that the rise in temperature did not exceed 45° C. The polymer solution was then cooled to ~30° C. again by circulating water through the jacket of the reactor. The physical and performance results are given in Table 2.

Comparative Example 2

The same exact procedure as described in comparative example 1 above was used in the preparation of Comparative Example 2, except the crosslinker, MEMO, was added in 75%/25% proportion between Step 1 (1.70 LB MEMO) and Step 2 (0.56 LB MEMO), but keeping the total amount the same as above.

Examples 1-4

The following description in Example 1 and the specific proportional amounts of all ingredients for larger volume of flexible absorbent binder polymer solutions preparation as set forth in Table 2 provide the basis for Examples 1-4.

Example 1

First, a pre-neutralized (about 60% degree of neutralization, DN) monomer solution was prepared by the following method. About 180 g water was added into a 1-L beaker equipped with a magnetic stirrer and a temperature probe. To the water, 59.23 g of glacial acrylic acid was added with stirring. Then, 39.5 g of 50% aq. NaOH was added slowly to the aqueous solution with a moderate speed of stirring. This aqueous solution was cooled to about 30° C. in a water bath, and another aliquot of 59.25 g glacial acrylic acid was added to the aqueous solution. Then, a second aliquot of 39.5 g 50% aq. NaOH was added slowly to the aqueous solution.

Then the neutralized acrylic acid solution was cooled to about 25-30° C. in a water bath.

To the pre-neutralized monomer solution, 0.3 g of 50% w/w hypophosphorous acid solution (chain transfer agent) was added.

A homogenous mixture of 17.5 g polyethylene glycol (PEG)400 and 2.1 mL of 3-(trimethoxysilyl)propyl methacrylate (MEMO) crosslinker was prepared by adding MEMO into PEG with rapid stirring. This mixture was then added to preneutralized monomer solution, and the mixture was well stirred for a few minutes.

Two initiator system solutions were prepared by dissolving 1.71 g sodium erythorbate (SEB) in 18.96 g water and by dissolving 4.56 g 35% $H_2O_2$ in 17.73 g water.

The polymerization was carried out as follows: Into a 1-L jacketed glass reactor, 195.6 g previously sparged water with $N_2$ gas was added. The temperature of this heel water was kept at 22-24° C. The slow flowing $N_2$ gas, the preneutralized monomer solution, and the two initiator system solutions were introduced into a reactor via three inlets in the reactor lid. Each of the two initiator system solutions were introduced into the reactor through the inlets of opposite sides of the reactor. The monomer and initiator solutions were added drop wise by three peristaltic pumps simultaneously for a predetermined period of time at predetermined dosage rates while the reaction solution water was being stirred under a slow stream of $N_2$ gas. The peristaltic pumps were previously calibrated for desired flow rate of each solution. The polymerization reaction kinetics data was monitored and recorded by a data acquisition software for recording temperature change as a function of time. The preneutralized monomer solution was added over a period of time, usually between 30 minutes and 120 minutes, but typically 60 minutes. The two initiator system solutions were added both during the polymerization procedure and for an additional 60 minutes beyond the monomer addition time.

The solution temperature starts to increase after 6-8 minutes of addition of reactants and continues to gradually climb. The temperature of the reaction was allowed to reach a predetermined maximum temperature, usually between 40 and 70° C., and most typically 60° C. This temperature was maintained by circulating cooling water through the reactor.

During the preneutralized monomer addition, the initiator solutions are added at a rate such that half of the solutions described above are added during the monomer addition. After the monomer feed is completed, the rate of the initiator solutions addition was altered such that the remaining half of each solution was added during a 30-minute period. Then, additional SEB and $H_2O_2$ solutions at concentrations of SEB 1.31 g in 14.60 g water and 1.31 g 35% $H_2O_2$ in 5.05 g water were added for additional 30 minutes as a kill for residual monomer. The speeds of the peristaltic pumps used to dose the initiator solutions were adjusted such that appropriate feed rates were obtained.

After the completion of all initiator solutions additions, the polymerization solution was stirred for additional 90 minutes. At this time, the polymerization solution starts to cool down gradually. After 90 minutes of additional stirring, the polymer solution is cooled to approximately (~) 30° C. by circulating water through the jacket of the reactor. 22.35 g of 50% NaOH solution was added to post-neutralize the superabsorbent polymer binder solution to a final degree of neutralization of 77%. Cooling was continued during the addition of the sodium hydroxide post-neutralization such that the temperature of the reaction mixture does not exceed 45° C. The resulting polymer solution was stirred for approximately 5-30 minutes after the addition of NaOH. The polymer solution was then cooled to ~30° C. again by circulating water through the jacket of the reactor.

Table 2 includes information about the properties of the solution and the resulting flexible absorbent binder.

TABLE 2

Solution and Performance Characteristics of Flexible Absorbent Binder

| Sample ID | Wt of FAB Solution (LB) | Solution Properties | | | | Performance Characteristics of Flexible Absorbent Binder | | | |
|---|---|---|---|---|---|---|---|---|---|
| | | % Solids | Visc. (cPs) | Solution Residual Acrylic Acid (ppm) | Color | Product Residual Acrylic Acid (ppm) | GRC g/g | NRC g/g | Color |
| Comp 1 | 700 | 33.7 | 467 | 1005 | Gradually developed brownish yellow | — | 9.8 | 13.9 | Slight off-white |
| Comp 2 | 700 | — | 330 | — | Slight brown | — | 7.7 | 11.2 | None |
| Ex 1 | 1.28 | — | — | 415 | Clear, Colorless | BDL | 16.2 | 22.6 | None |
| Ex 2 | 215 | | | 482 | Clear, Colorless | 964 | 14.0 | 20.5 | None |
| Ex 3 | 1050 | 33.5 | 585 | 307 | Clear, Colorless | 254 | 12.3 | 18.9 | None |
| Ex 4 | 1450 | 33.7 | 1280 | 2863 | Clear, Colorless | 698 | 14.7 | 21.1 | None |

BDL = Below Detection Limit
GRC = Gross Adjusted Retention Capacity
NRC = Net Adjusted Retention Capacity

What is claimed is:

1. A process for making a flexible superabsorbent binder polymer composition comprising the steps of:
   a) preparing a preneutralized monomer solution where the acidic monomer is at least partially neutralized;
   b) adding a mixture of low molecular weight polyolefinic glycols having a molecular weight from about 200 to about 10,000, and an ethylenically unsaturated monomer containing a trialkoxysilane functional group to the preneutralized monomer solution;

c) preparing at least 2 initiator system solutions;

d) continuously adding the monomer solution of step b) during polymerization and the at least 2 initiator system solutions of step c) to water to form a mixture wherein the mixture reacts to form a polymer;

e) optionally adding the at least 2 initiator system solutions of step c) at an accelerated flow rate;

f) cooling the polymer; and g) post-neutralizing the cooled polymer of step f) to increase the neutralization of the polymer to at least about 60 mol %.

2. The process to make the flexible superabsorbent binder polymer composition of claim 1 wherein the preneutralized monomer solution comprises acrylic acid.

3. The process to make the flexible superabsorbent binder polymer composition of claim 1 wherein the initiator system comprises an initiator selected from an oxidizing agent and a reducing agent.

4. The process to make the flexible superabsorbent binder polymer composition of claim 1 wherein the oxidizing agent is hydrogen peroxide and the reducing agent is sodium erythorbate.

5. The process to make the flexible superabsorbent binder polymer composition of claim 1 wherein the mole ratio of oxidizing agent to the reducing agent is from about 6:1 to about 2:1.

6. The process to make the flexible superabsorbent binder polymer composition of claim 1 wherein the polymerization solution is cooled in step g) to from about 20° C. to about 40° C.

7. The process to make the flexible superabsorbent binder polymer composition of claim 1 wherein the ethylenically unsaturated monomer containing a trialkoxysilane functional group is methacryloxypropyl trimethoxy silane (MEMO).

8. The process to make the flexible superabsorbent binder polymer composition of claim 1 wherein the low molecular weight polyolefinic glycols is a polyethylene glycol (PEG).

9. A flexible superabsorbent binder polymer composition of claim 1.

10. A process for making a flexible superabsorbent binder polymer composition comprising the steps of:

a) preparing a monomer solution where the acidic monomer is at least partially neutralized;

b) adding a chain transfer agent to the monomer solution;

c) adding a mixture of low molecular weight polyolefinic glycols having a molecular weight from about 200 to about 10,000, and an ethylenically unsaturated monomer containing a trialkoxysilane functional group to the monomer solution;

d) preparing at least 2 initiator system solutions and adding the initiator system solutions to the monomer solution wherein the mixture reacts to form a polymer;

e) cooling the polymer of step d); and f) post-neutralizing the cooled polymer of step e) to increase the neutralization of the polymer to at least about 60 mol % wherein the mole ratio of oxidizing agent to the reducing agent is from about 6:1 to about 2:1.

11. The process to make the flexible superabsorbent binder polymer composition of claim 10 wherein the preneutralized monomer solution comprises acrylic acid.

12. The process to make the flexible superabsorbent binder polymer composition of claim 10 wherein the initiator system comprises an initiator selected from an oxidizing agent and a reducing agent.

13. The process to make the flexible superabsorbent binder polymer composition of claim 10 wherein the oxidizing agent is hydrogen peroxide and the reducing agent is sodium erythorbate.

14. The process to make the flexible superabsorbent binder polymer composition of claim 10 wherein the polymerization solution is cooled in step e) to from about 20° C. to about 40° C.

15. The process to make the flexible superabsorbent binder polymer composition of claim 10 wherein the ethylenically unsaturated monomer containing a trialkoxysilane functional group is methacryloxypropyl trimethoxy silane (MEMO).

16. The process to make the flexible superabsorbent binder polymer composition of claim 10 wherein the low molecular weight polyolefinic glycols is a polyethylene glycol (PEG).

17. A flexible superabsorbent binder polymer composition of claim 10.

18. A process for making a flexible superabsorbent binder polymer composition comprising the steps of:

a) preparing a preneutralized monomer solution, having at least about 40 mol % degree of neutralization comprising a chain transfer agent, and a mixture of low molecular weight polyolefinic glycols having a molecular weight from about 200 to about 10,000, and an ethylenically unsaturated monomer containing a trialkoxysilane functional group;

b) preparing at least 2 initiator system solutions;

c) continuously adding the monomer solution of step a) during polymerization and the at least 2 initiator system solutions of step b) to water to form a mixture wherein the mixture reacts to form a polymer;

d) adding the at least 2 initiator system solutions of step b) at an accelerated flow rate;

e) cooling the polymer of step d); and f) post-neutralizing the cooled polymer of step e) to increase the neutralization of the polymer to at least about 60 mol %.

19. The process to make the flexible superabsorbent binder polymer composition of claim 18 wherein the preneutralized monomer solution comprises acrylic acid.

20. The process to make the flexible superabsorbent binder polymer composition of claim 18 wherein the initiator system comprises an initiator selected from an oxidizing agent and a reducing agent.

21. The process to make the flexible superabsorbent binder polymer composition of claim 18 wherein the oxidizing agent is hydrogen peroxide and the reducing agent is sodium erythorbate.

22. The process to make the flexible superabsorbent binder polymer composition of claim 18 wherein the mole ratio of oxidizing agent to the reducing agent is from about 6:1 to about 2:1.

23. The process to make the flexible superabsorbent binder polymer composition of claim 18 wherein the polymerization solution is cooled in step e) to from about 20° C. to about 40° C.

24. The process to make the flexible superabsorbent binder polymer composition of claim 18 wherein the ethylenically unsaturated monomer containing a trialkoxysilane functional group is methacryloxypropyl trimethoxy silane (MEMO).

25. The process to make the flexible superabsorbent binder polymer composition of claim 18 wherein the low molecular weight polyolefinic glycols is a polyethylene glycol (PEG).

26. A flexible superabsorbent binder polymer composition of claim 18.

* * * * *

UNITED STATES PATENT AND TRADEMARK OFFICE
CERTIFICATE OF CORRECTION

PATENT NO.       : 7,335,713 B2
APPLICATION NO.  : 11/561145
DATED            : February 26, 2008
INVENTOR(S)      : Angela Jones Lang et al.

It is certified that error appears in the above-identified patent and that said Letters Patent is hereby corrected as shown below:

Column 6

Line 41: "Dow Corning®" should read -- Dow Corning Corp. --.

Line 65: "functional" should read -- functionality --.

Column 9

Line 8: "azobis-2-amidinopropanedihydrchloride" should read
-- azobis-2-amidinopropanedihydrochloride --.

Line 14: "2,2'-azobis-2-amidinopropanedihydrchloride" should read
-- 2,2'-azobis-2-amidinopropanedihydrochloride --.

Lines 34-35: "2,2'-azobis-2-amidinopropanedihydrchloride,diperoxyketals;" should read
-- 2,2'-azobis-2-amidinopropanedihydrochloride, diperoxyketals; --.

Column 10

Line 2: "about 1,000,000 to about" should read -- about 100,000 to about --.

Column 14

Line 39: "pain roller" should read -- paint roller --.

Signed and Sealed this

Thirtieth Day of November, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,335,713 B2 |
| APPLICATION NO. | : 11/561145 |
| DATED | : February 26, 2008 |
| INVENTOR(S) | : Angela Jones Lang et al. |

It is certified that error appears in the above-identified patent and that said Letters Patent is hereby corrected as shown below:

Column 15

Lines 13-14: "W2=Weight of wet coated circle after suction box 0.0263=A factor for uncoated dry circle weight" should read -- W2=Weight of wet coated circle after suction box
   0.0263=A factor for uncoated dry circle weight --.

Signed and Sealed this

Fourth Day of January, 2011

David J. Kappos
*Director of the United States Patent and Trademark Office*